(12) United States Patent
Jang et al.

(10) Patent No.: US 7,881,298 B2
(45) Date of Patent: Feb. 1, 2011

(54) METHOD FOR SEGMENTING AND REASSEMBLING PACKET BASED ON TREE STRUCTURE, AND METHOD FOR TRANSMITTING/RECEIVING PACKET USING THE SAME

(75) Inventors: Il-Soon Jang, Daejeon (KR); Byung-Han Ryu, Daejeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 676 days.

(21) Appl. No.: 11/665,638

(22) PCT Filed: Jul. 26, 2005

(86) PCT No.: PCT/KR2005/002407

§ 371 (c)(1),
(2), (4) Date: Apr. 18, 2007

(87) PCT Pub. No.: WO2006/043746

PCT Pub. Date: Apr. 27, 2006

(65) Prior Publication Data

US 2008/0037547 A1    Feb. 14, 2008

(30) Foreign Application Priority Data

Oct. 22, 2004 (KR) .................. 10-2004-0084697

(51) Int. Cl.
*H04L 12/56* (2006.01)
(52) U.S. Cl. .................. 370/392; 370/474; 714/746
(58) Field of Classification Search .................. None
See application file for complete search history.

(56) References Cited

U.S. PATENT DOCUMENTS

| 5,757,367 | A | * | 5/1998 | Kapoor .................. 375/219 |
| 6,163,547 | A | | 12/2000 | De Vriendt et al. |
| 6,278,883 | B1 | * | 8/2001 | Choi .................. 455/552.1 |
| 6,307,867 | B1 | * | 10/2001 | Roobol et al. ............... 370/470 |
| 6,317,430 | B1 | * | 11/2001 | Knisely et al. ............. 370/394 |
| 6,359,877 | B1 | * | 3/2002 | Rathonyi et al. ............ 370/349 |

(Continued)

FOREIGN PATENT DOCUMENTS

| JP | 16282197 | 10/2004 |
| KR | 2001-0035467 | 5/2001 |
| KR | 2001-0052354 | 6/2001 |
| KR | 2002-0000650 | 1/2002 |
| WO | WO-0021253 | 4/2000 |

*Primary Examiner*—Daniel J Ryman
*Assistant Examiner*—Brian Roberts
(74) *Attorney, Agent, or Firm*—Rabin & Berdo, P.C.

(57) ABSTRACT

Provided is a method of segmenting a packet using a tree structure in order to reduce headers in the packet when the packet is transmitted or received in a wireless communication system using an adaptive modulation and coding (AMC), and a method of transmitting/receiving a packet using the same. The method includes the steps of: determining whether a transmitting processing data unit (PDU) is a retransmitted PDU; determining whether a size of the retransmitted PDU is a transmittable size allowed by a corresponding adaptive modulation and coding (AMC) option if the transmitting PDU is the retransmitted PDU; and segmenting the retransmitting PDU, inserting a header and a sub header with identification information for reassembling into each of the segmented PDUs and transmitting the segmented PDUs.

4 Claims, 9 Drawing Sheets

U.S. PATENT DOCUMENTS

| | | |
|---|---|---|
| 6,519,731 B1 * | 2/2003 | Huang et al. .............. 714/751 |
| 6,665,313 B1 | 12/2003 | Chang et al. |
| 7,519,084 B2 * | 4/2009 | Mangin et al. ............. 370/474 |
| 2002/0001314 A1 | 1/2002 | Yi et al. |
| 2002/0150040 A1 * | 10/2002 | Tong et al. ................ 370/216 |
| 2003/0206534 A1 | 11/2003 | Wu |
| 2004/0017823 A1 | 1/2004 | Kim et al. |
| 2006/0034175 A1 * | 2/2006 | Herrmann ................. 370/236 |

* cited by examiner

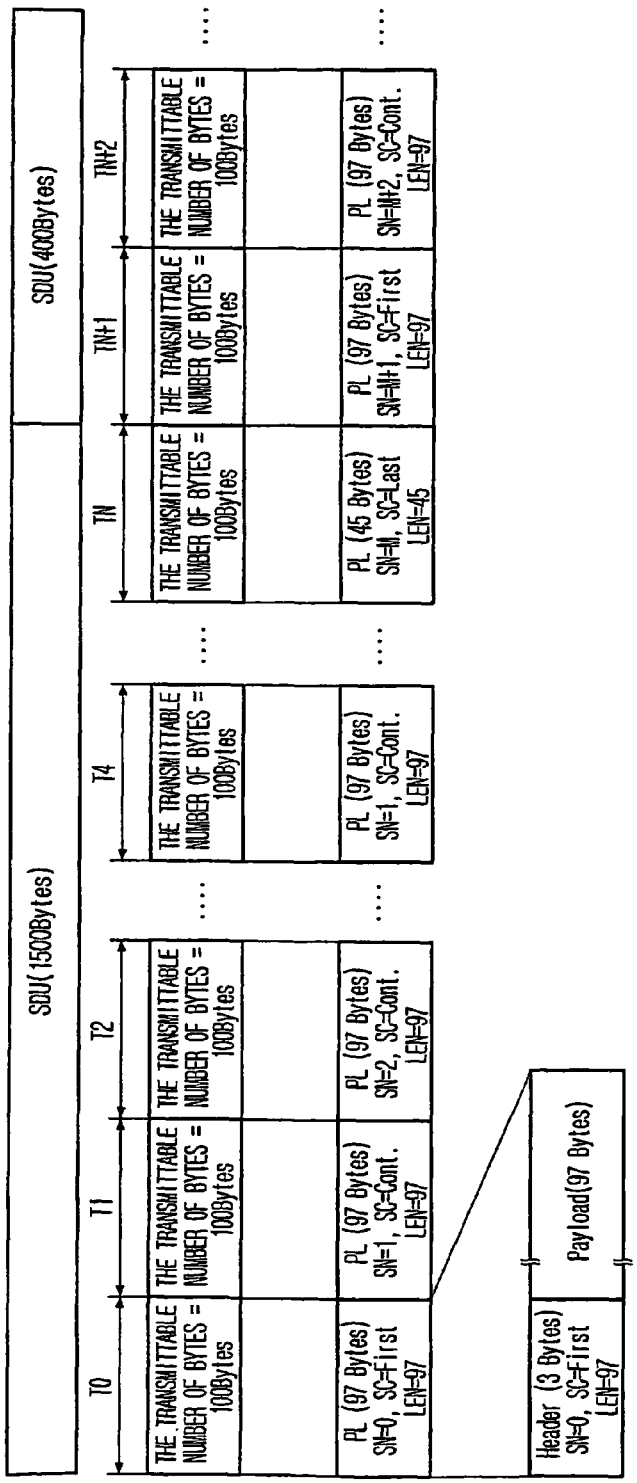
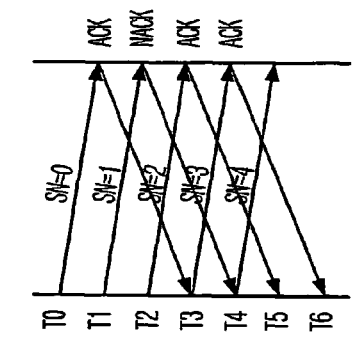
FIG. 3 (Prior Art)

FIG. 5
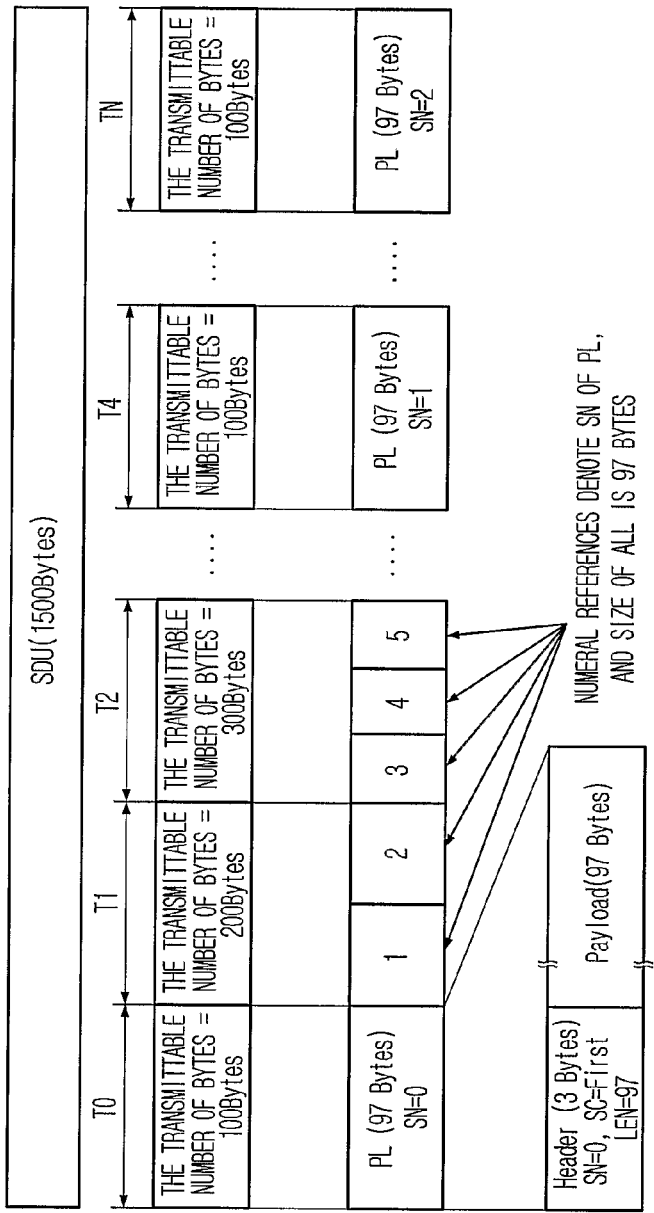
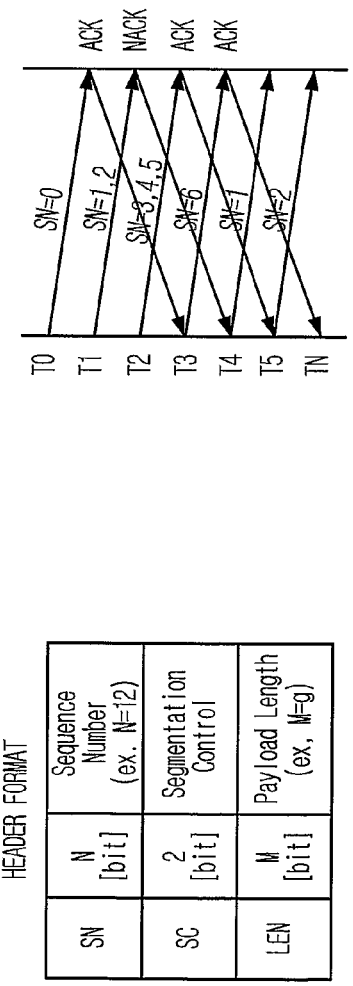

METHOD FOR SEGMENTING AND REASSEMBLING PACKET BASED ON TREE STRUCTURE, AND METHOD FOR TRANSMITTING/RECEIVING PACKET USING THE SAME

TECHNICAL FIELD

The present invention relates to a method for segmenting and reassembling a packet and a method for transmitting/receiving a packet using the same; and more particular, to a method for segmenting and reassembling packet using a tree structure to reduce the number of headers when a wireless communication system employing an adaptive modulation and coding (AMC) transmits or receives packets, and a method for transmitting/receiving a packet using the same.

BACKGROUND ART

FIG. 1 is a block diagram for illustrating entities for segmenting and reassembling source data unit (SDU) packets in a medium access control (MAC) layer in accordance with the related art.

Segmentation is performed at a transmitting side. That is, a segment entity segments a source data unit (SDU) into packets each having a transmittable size based on a corresponding option of an adaptive modulation and coding (AMC).

Herein, the SDU is a packet received from a higher layer, i.e., an Internet protocol layer and a processing data unit (PDU) denotes each piece of segmented SDUs having a transmittable size by the AMC.

FIG. 2 is a graph showing a signal-to-noise ratio (SNR) and a bit error rate (BER) corresponding to options of the AMC.

Referring to FIG. 2, in case of a service requiring $10^{-6}$ BER, the option 1 of the AMC is selected for a 5 dB SNR and the option 2 of the AMC is selected for 7 dB of SNR. If a quadrature phase shift keying (QPSK) is used as a modulation scheme with a channel coding rate of $\frac{1}{6}$ in the AMC option 1, a single carrier wave can transmit $\frac{1}{3}$ bit. If the QPSK is used as the modulation scheme with a channel coding rate of $\frac{1}{3}$ in the AMC option 2, a single carrier wave can transmit $\frac{2}{3}$ bit. Since a wireless channel condition varies according to a speed and a direction of a channel, the AMC option must be properly selected according to the channel conditions in order to transmit data with satisfying the required BER.

FIG. 3 is diagram showing transmission and retransmission of a segmented SDU in a channel having constant environment according to the time.

Since a wired channel has a constant channel environment, a data transfer rate of a lower layer is fixed when a service is started. For example, if 100 byte of data can be transmitted in a single transmission period, the segment entity in the transmitting size divides a SDU inputted from the higher layer by a unit of 100 byte. That is, the SUD is divided into a plurality of PDUs each having 100 bytes. Then, a sequence number (SN) is assigned to each of the PDUs in order. If an error is generated while transmitting a particular PDU, a corresponding PDU is retransmitted using the assigned sequence number.

The PDUs are transferred to a lower layer, i.e., a physical layer, and then transmitted to a receiving side through a wireless channel. As shown in FIG. 1, the receiving side includes a SDU buffer, a reassembling entity, a PDU inserting entity, and a PDU buffer. The PDU inserting entity orderly inserts the received PDUs to the PDU buffer according to the SN of the PDU. The reassembling unit reassembles the SDU through rearranging the received PDUs based on the SN and segmentation control (SC) identification included in a header of the PDU. The reassembled SDU is transferred to a higher layer. The SC identification has options such as No, First, Continue and Last. The No option denotes un-segmented SDU, the option of First denotes a first PDU, the Continue option denotes intermediate PDUs and the Last option denotes the last PDU. Such options are correspondently set in the PDU header, and the SC identification is not changed when a PDU is retransmitted.

As described above, a SDU is configured of PDUs having sequence numbers (SN) with corresponding SC identifications, such as the First option for the first PDU, the Continue option for intermediate PDUs and the Last option for the last PDU. The receiving side transmits an acknowledge (ACK) signal to the transmitting side in order to notice normal receipt of the transmitted PDUs when the receiving side normally receives PDUs.

If a channel environment varies according to the time, for example, a wireless channel environment, the number of data to be transmitted varies too.

FIG. 4 is a view showing why it is impossible to retransmit segmented SDUs in a channel having variable environment according to the time.

The size of the PDU is not changed when the PDUs are transmitted through the wired channel that has the constant condition as shown in FIG. 3. However, the size of the PDU is changed from time to time in a wireless channel that has variable conditions. That is, the AMC options vary according to the conditions of the wireless channel which is changed from time to time. Consequently, a data transfer rate is changed according to the variation of the AMC options.

As shown FIG. 4, if transmitting 200 byte of data fails at a first transmission period T1, retransmission is tried at a fourth transmission period T4. If the wireless channel environment at the T4 is worse than that at the T1, that is, the wireless channel environment at the T4 allows only 100 byte data to be transmitted, a lower AMC option is allocated. As a result, it is impossible to retransmit the 200 byte data at the T4.

Therefore, the PDUs must be segmented again into PDUs of 10 byte each and corresponding new SNs must be assigned to new PDUs. However, if the PDUs are successfully transmitted in the transmission periods T2 and T3, it is impossible to reassign the SNs. That is, it must wait for another transmission period having a channel environment that allows 200 byte of data to be transmitted for retransmitting the 200 byte of PDU without and reassigning SN. Therefore, transmission of the SDU is delayed.

In order to improve such a drawback, a unit size of PDU is determined corresponding to a minimum AMC option and the SDU is segmented and the SNs are assigned to each of the PDUs based on the determined unit size, as shown in FIG. 5. The SDU is segmented into more numbers of PDUs of smaller size. However, when the higher AMC option is allowed in a particular transmission period because of good channel environment, many PDUs are transmitted in the single transmission period. In this case, many PDU headers are also transmitted with the PDUs in the single transmission period. Therefore, it may degrade transmission efficiency. Furthermore, if the SDU is segmented into PDUs with the minimum AMC option, a length of an identification field for a sequence number becomes longer. As a result, the required length of the header also becomes longer. It also degrades the transmission efficiency.

DISCLOSURE

Technical Problem

It is, therefore, an object of the present invention to provide a method for reassembling processing data units (PDU) without increasing a size of a header after re-segmenting the PDU which is transmitted through a channel having a channel environment varied from time to time.

It is another object of the present invention to provide a method of assigning new sequence numbers (SN) when a transmitting packet is re-segmented.

Technical Solution

In accordance with one aspect of the present invention, there is provided a method of segmenting a packet at a transmitting side to transmit the segmented packets to a receiving side when a channel environment varies from time to time, including the steps of: determining whether a transmitting processing data unit (PDU) is a retransmitted PDU; determining whether a size of the retransmitted PDU is a transmittable size allowed by a corresponding adaptive modulation and coding (AMC) option if the transmitting PDU is the retransmitted PDU; and segmenting the retransmitting PDU, inserting a header and a sub header with identification information for reassembling into each of the segmented PDUs and transmitting the segmented PDUs.

In the step of segmenting, the retransmitted PDU may be segmented into two PDUs each having lower level identification information different from the identification information for reassembling.

In accordance of another aspect of the present invention, there is provided a method of transmitting a packet by segmenting the packet at a transmitting side and transmitting the segmented packets to a receiving side through a channel having an environment varied from time to time, including the step of inserting parameters related to retransmission in a sub header in case of a retransmission of processing data unit (PDU) which rarely occurs.

Advantageous Effects

According to the present invention, the segmented PDUs are reassembled without increasing a size of a header when the PDU is re-segmented for retransmission in a channel having a variable environment changed from time to time.

According to the present invention, a constant sequence number (SN) is used and a sub header is attached only when a retransmission case that occurs in one in 100 or 1000 transmission times. Therefore, the complexity of satisfying a reassembling speed is avoided and the transmission efficiency is improved.

DESCRIPTION OF DRAWINGS

The above and other objects and features of the present invention will become apparent from the following description of the preferred embodiments given in conjunction with the accompanying drawings, in which:

FIG. 3 shows transmission and retransmission of segmented SDUs in a channel having constant channel environment which is not changed from time to time;

FIG. 5 shows transmission and retransmission of PDUs when the PDUs are segmented corresponding to the minimum AMC option;

BEST MODE FOR THE INVENTION

Other objects and aspects of the invention will become apparent from the following description of the embodiments with reference to the accompanying drawings, which is set forth hereinafter.

A possibility of retransmission generally is $10^{-2}$ and $10^{-3}$. That is, the retransmission may occur once in 100 or 1000 transmissions.

Conventionally, a header includes parameters related to the retransmission that occurs very rarely. Such a header is inserted into a packet as a unit size that can be transmitted with the minimum AMC option in order to prepare against the retransmission, and a sequence number is assigned to each packet. Therefore, the transmission efficiency degrades.

A method of assigning a sequence number using a tree structure according to the present invention has an advantage that a new sequence number is assigned to a PDU when the retransmission occurs and the parameters related to the retransmission are not included in the header. When the retransmission occurs, a sub-header is used. As a result, the transmission efficiency is improved.

Figure 1:
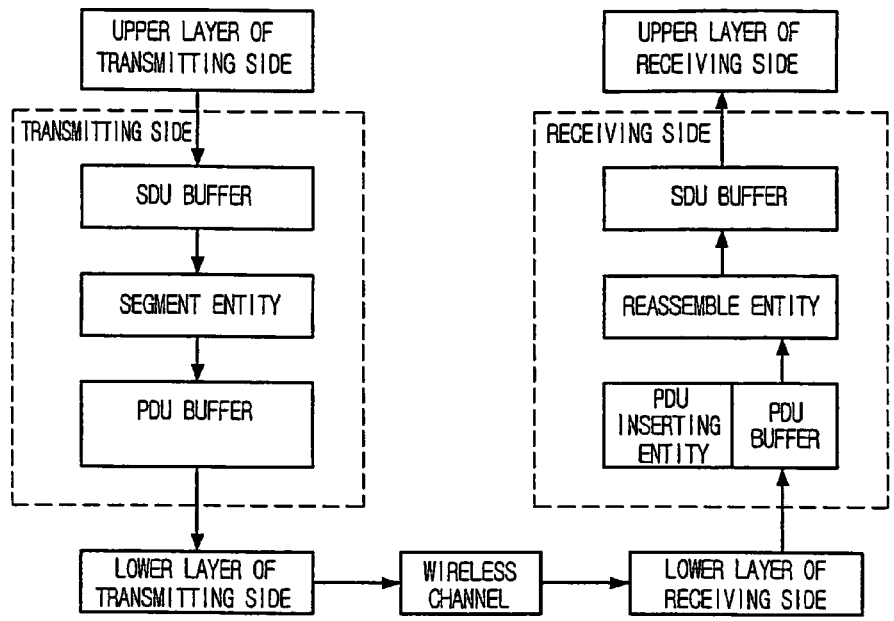
FIG. 1 is a block diagram illustrating conventional entities performing segmentation and reassembling of source data unit (SDU) packet in multiple access control (MAC)
Figure 2:
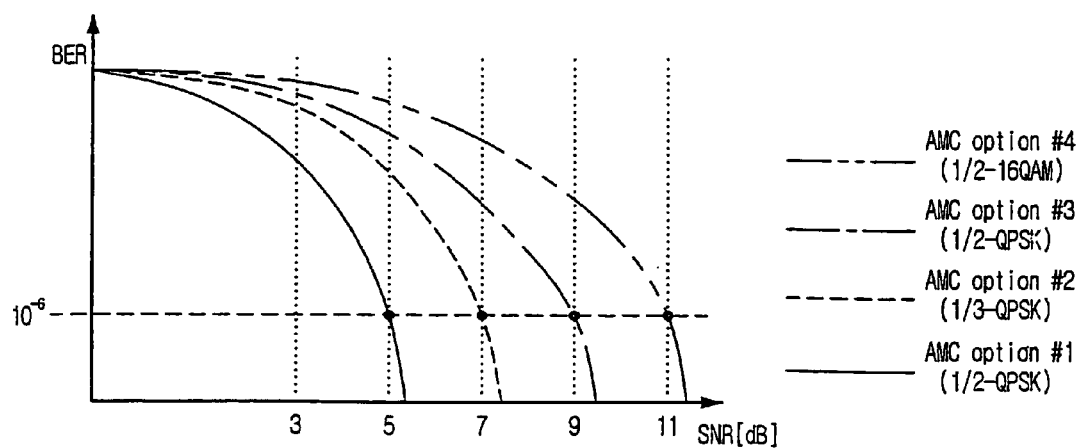
FIG. 2 is a graph showing a signal-to-noise ratio (SNR) and a bit error rate per an AMC option.
Figure 4:
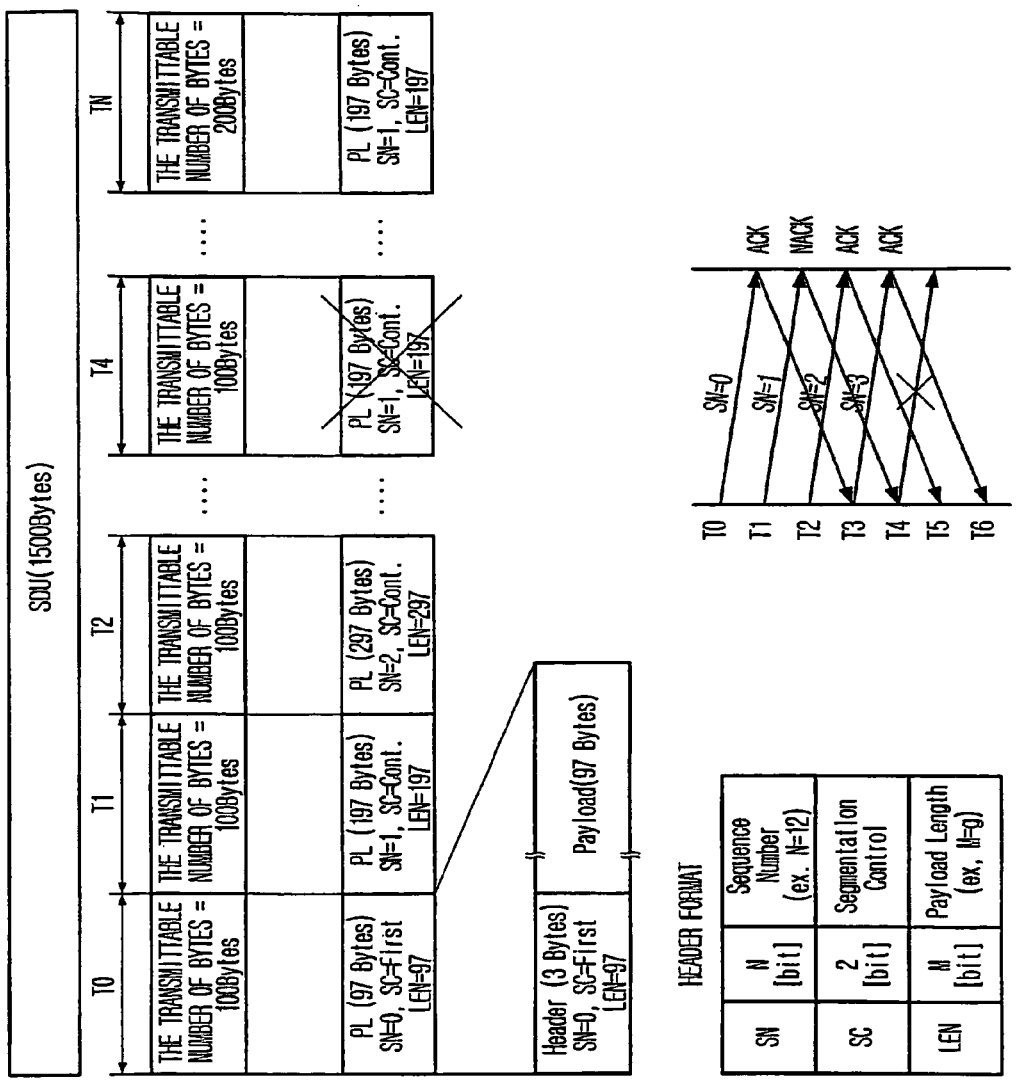
FIG. 4 shows why it is impossible that SDUs segmented according to the related arte cannot be retransmitted in a channel having environments varied from time to time.
Figure 6:
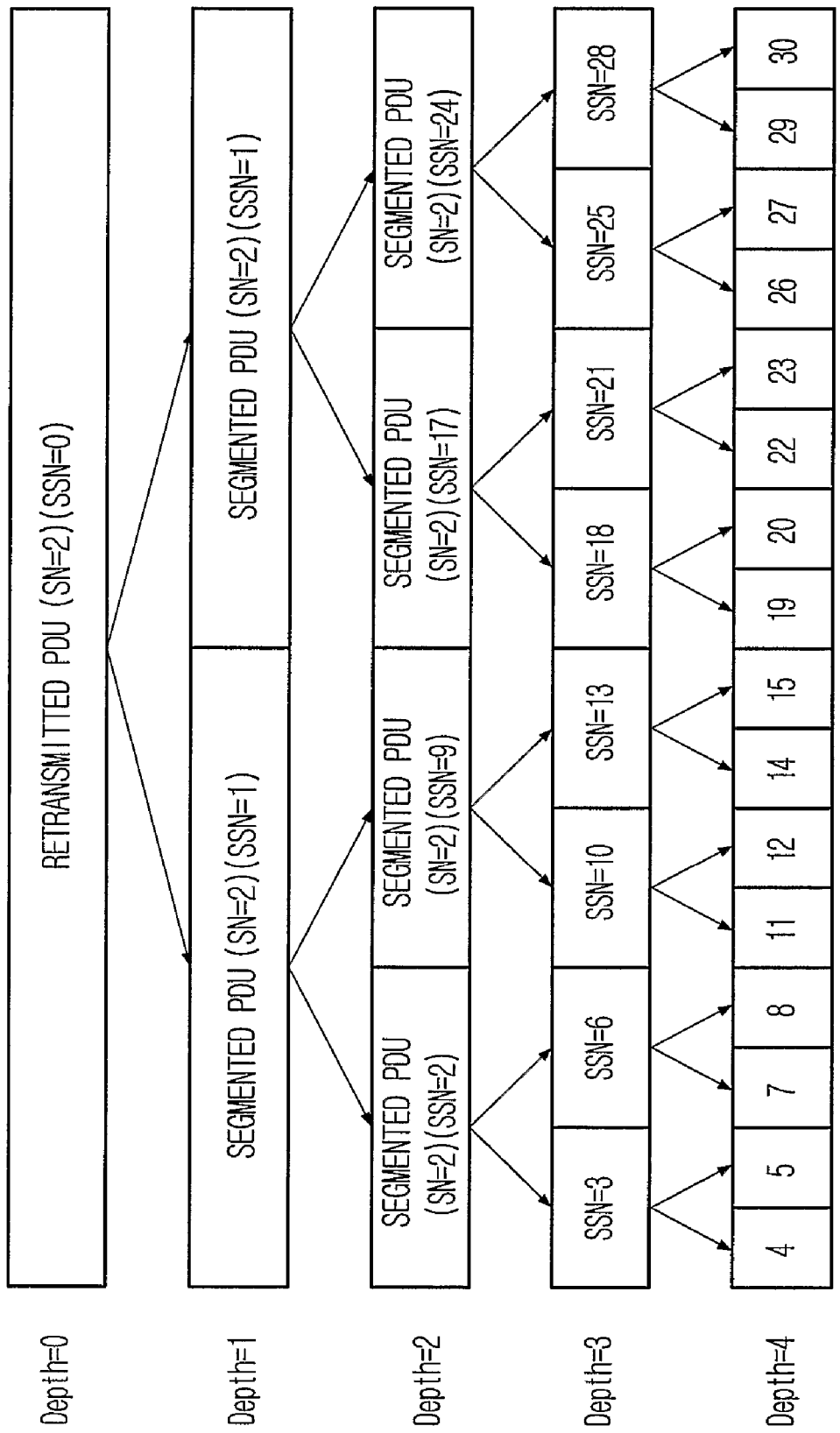
FIG. 6 is a diagram showing assigning of a sub-sequence number (SSN) to a sub-header when a retransmitting PDU is re-segmented and retransmitted at a transmitting side.

FIG. 6 is a diagram illustrating assigning of a sub-sequence number (SSN) to a sub-header when a PDU is segmented and retransmitted in accordance with a preferred embodiment of the present invention.

Although the method of assigning a SN using a tree structure according to the present embodiment can be used to assign a SN to a header, it can be used to assign the SSN into the sub-header. That is, a SSN is newly assigned to a sub-header or the assigned SSN of the sub-header is changed when the retransmission occurs. In this case, the SN of the retransmitted PDU is not changed. Hereinafter, the SSN denotes identification information for reassembling the PDU in a receiving side.

According to the present invention, a PDU is retransmitted with a previously assigned SN without including a sub-header when the channel environment allows an AMC option that can transmit the corresponding PDU. It assumes that the lower the AMC option is, the smaller amount data is allowed to be transmitted in a corresponding transmission period. If the newly assigned AMC option is lower than the AMC option allocated to the previous transmission, the PDU must be re-segmented for retransmission and identification information must be inserted for reassembling of the PDUs at the receiving side.

The PDU is re-segmented into a plurality of PDUs each having a smaller size for retransmission. For example, if the PDU is segmented into 16 segments, it requires a 5 bit-long SSN field. If the PDU is re-segmented more segments than 16, the SSN field must be extended.

At first, a PDU to be retransmitted is divided into only two sub PDUs. Herein, the PDU is defined as a parent PDU and the two sub PDUs are defined as child PDUs. If the parent PDU receives 1 as a SSN, the two child-PDUs receive 2 and 9 as the SSN, respectively.

If the channel environment does not allow an AMC option that can transmit the PDU having the SSN of 16 after successfully transmitting the PDU having the SSN of 1, the PDU having the SSN 16 is re-segmented into two PDUs and the SSN 17 and the SSN 24 are assigned to each of the two divided PDUs.

If the PDU with the SSN 1 is successfully transmitted, the child-PDUs thereof are not generated and the SSNs, i.e., 2, 9, 3, 5, 10, and so on, are not used. If the PDU with the SSN 1 is not successfully transmitted, it must be retransmitted. In this case, if the channel environment allows only lower AMC option than the previous assigned AMC option, the PDU with SSN 1 must be divided into two child-PDUs and the SSNs 2 and 9 are assigned to each of the two child-PDUs, respectively.

When P denotes a SSN of a parent PDU, D denotes depth and a length of bits to represent the SSN identification is L, the SSNs of child PDUs are assigned by following equations. That is, the SSN of the first child PDUs are assigned based on Eq. 1 and the SSN of the second child PDUs are assigned based on Eq. 2.

$$SSN_{1stPDU} = P+1 \qquad \text{Eq. 1}$$

$$SSN_{2ndPDU} = P+2^{(L-D-1)} \qquad \text{Eq. 2}$$

For example, if the length of bits to represent the SSN identification is 5 bit and the SSN of the parent PDU is 9, then the depth must be 2, the SSN of first child PDU is 10 and the SSN of second child PDU is 13.

Figure 7:
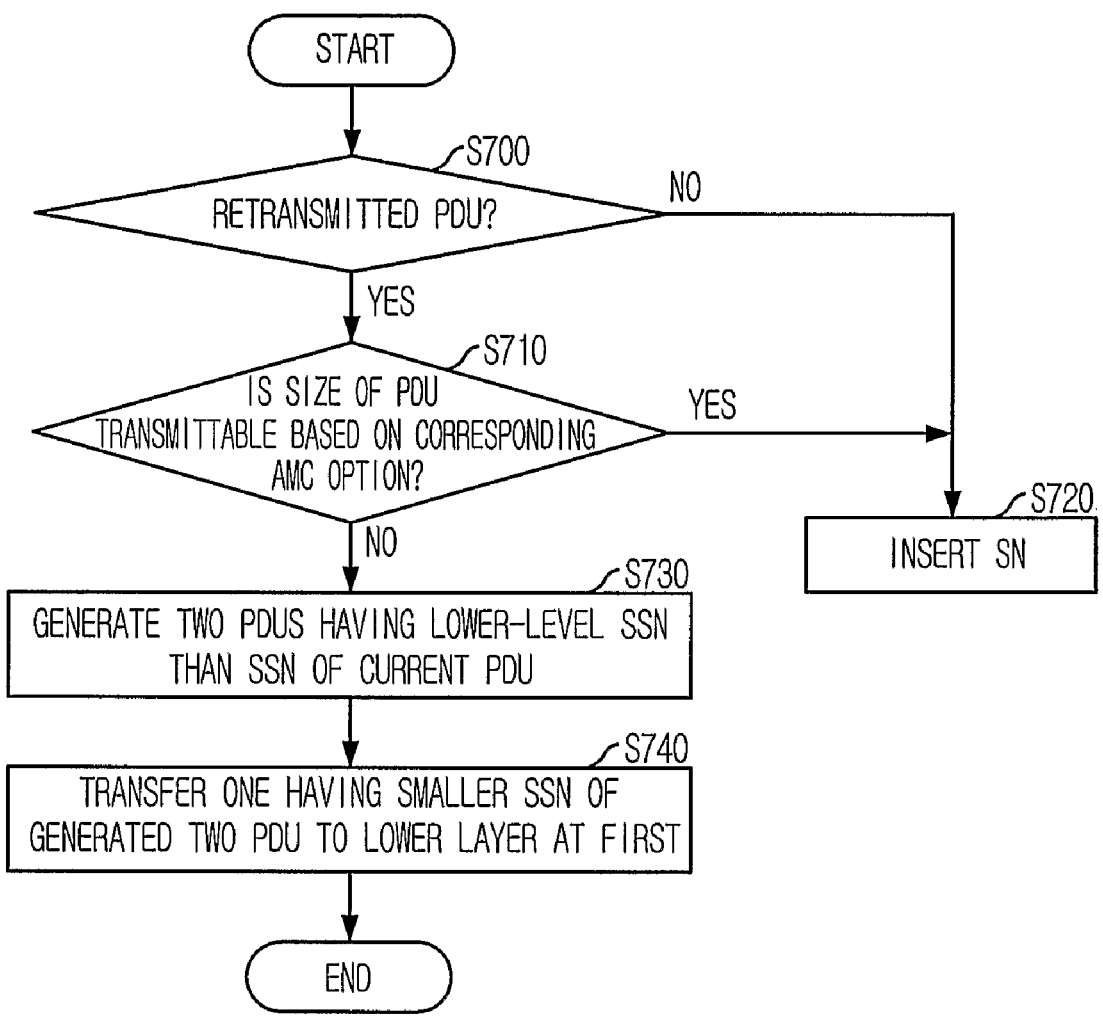
FIG. 7 is a flowchart of a method of segmenting packets for retransmission in accordance with a preferred embodiment of the present invention.

FIG. 7 is a flowchart of a method of segmenting packets for retransmission in accordance with a preferred embodiment of the present invention.

Referring to FIG. 7, a transmitting side determines whether or not a current PDU is a PDU to be retransmitted at step S700. If it is the PDU for retransmission at step S700, it determined whether the size of PDU is transmittable size allowed by a corresponding AMC option at step S710. If the size of PDU is not transmittable at step S710, the PDU is re-segmented at step S730. After segmenting, a header and a sub-header having identification information for reassembling are inserted into the segmented PDUs and transmitted to a receiving side. As described above, two child PDUs are generated with lower SSNs. Then, the transmitting side firstly transmits one having smaller SSN between two generated child PDUs to the lower layer at step S740.

If the PDU is not for the retransmission at step S700, or if the size of PDU is transmittable allowed by the corresponding AMC option, the SN is inserted at step S720 and then the retransmission process is terminated.

Figure 8:
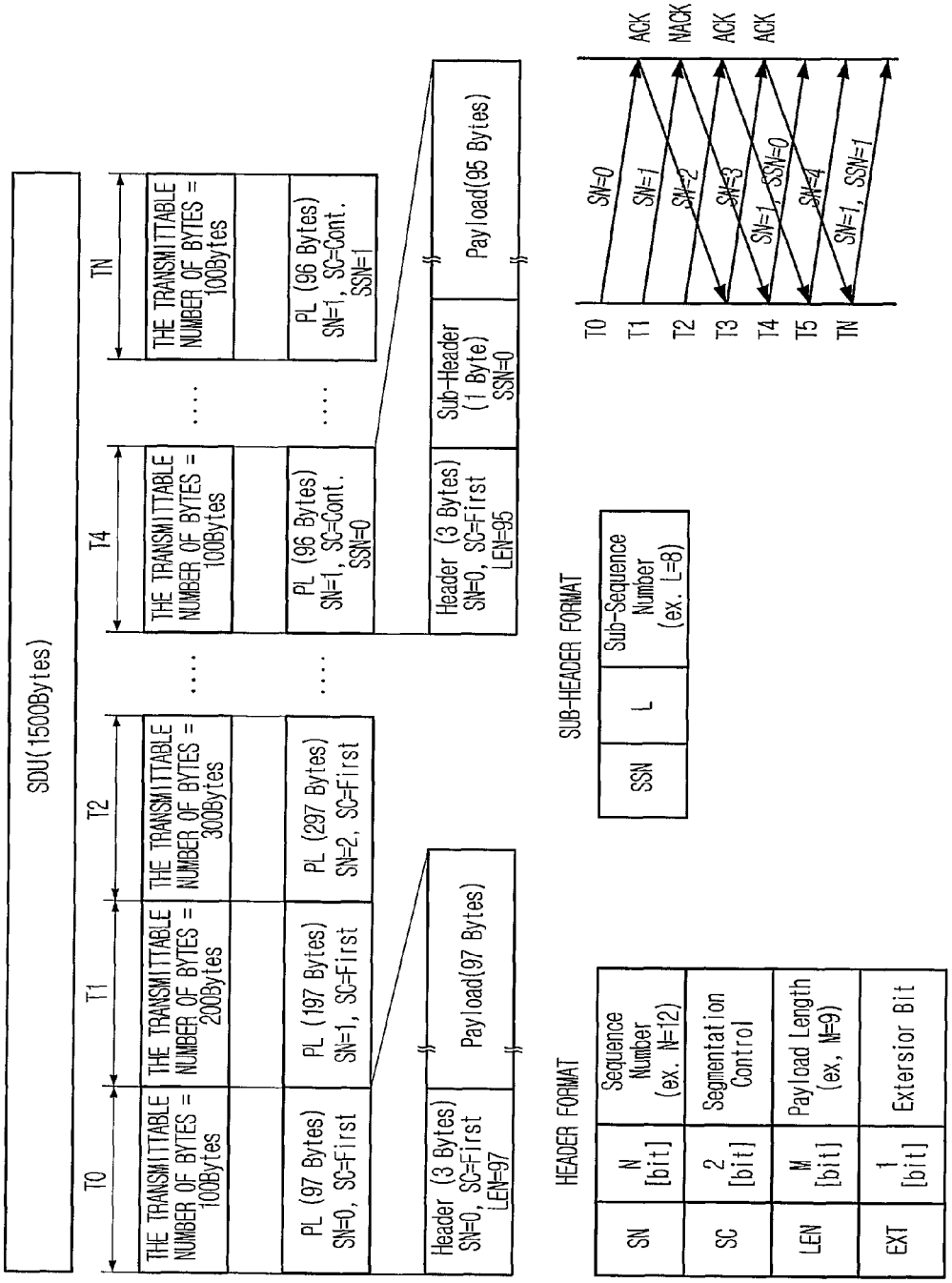
FIG. 8 is a diagram illustrating the use of sub header for retransmission in accordance with a preferred embodiment of the present invention.

FIG. 8 is a diagram illustrating the use of sub header for retransmission in accordance with a preferred embodiment of the present invention. As shown in FIG. 8, an EXT identification field of 1(0) is inserted into a header when the sub header is included. On the contrary, if the sub header is not included, an EXT identification field of 0(1) is inserted in the header. Other parameters are identically inserted into the header compared to the conventional methods. Therefore, the receiving side can determine whether it is retransmission and whether there is the sub-header or not based on the EXT parameter.

Figure 9:
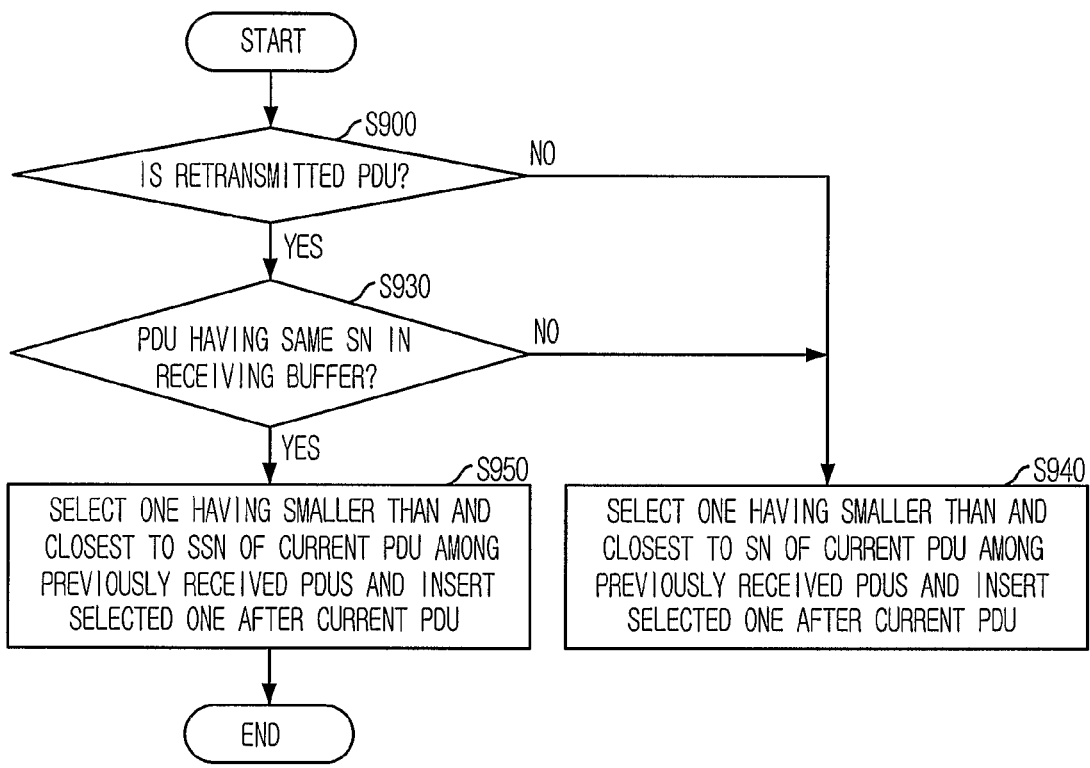
FIG. 9 is a flowchart of a method of inserting retransmitted PDU in a receiving bugger using SSN at a receiving side in accordance with a preferred embodiment of the present invention.

FIG. 9 is a flowchart of a method of inserting retransmitted PDU in a receiving buffer using a SSN at a receiving side in accordance with a preferred embodiment of the present invention.

Referring to FIG. 9, the receiving side determines whether a current PDU is a retransmitting PDU or not at step S900. If the current PDU is the retransmitted PDU at step S900, it determines whether there is a PDU having same SN in the receiving buffer at step S930. If there is the PDU having same SN in the receiving buffer, the receiving side searches a PDU having a SSN smaller than and closest to the SSN of the current PDU among the PDUs in the receiving buffer. If there is the PDU having the SSN smaller and closest to the current PDU, the current PDU is inserted after the searched PDU.

If the current PDU is not the retransmitted PDU at the S900, or if there is not PDUs having the same SN in the receiving buffer, the receiving side searches a PDU having a SN smaller than and closest to the SN of the current PDU among the PDUs in the receiving buffer. Then, the current PDU is inserted after the searched PDU.

A reassemble entity in the receiving side configures the one highest parent PDU using the SSN at first if the PDU is the retransmitted PDU. On the contrary, if the PDU is not the retransmitted PDU, the reassemble entity assembles the SDU using the SN or SC.

Figure 10:
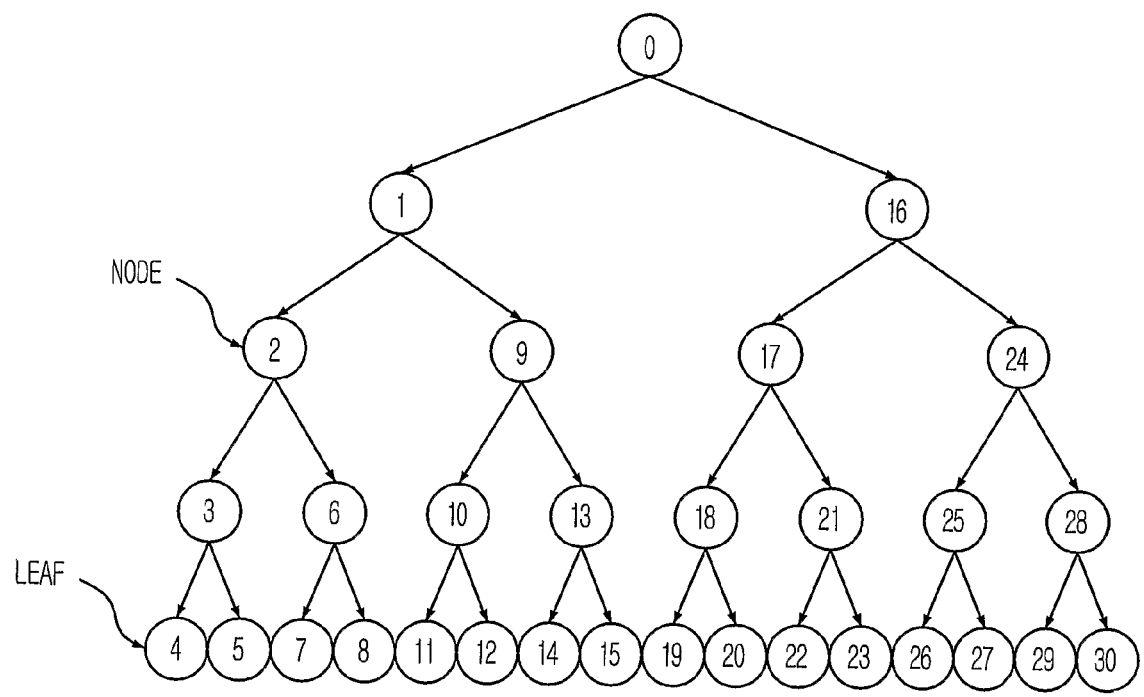
FIG. 10 shows a tree structure for describing reassembling of a highest parent PDU from retransmitted PDUs having SSNs in a receiving buffer in accordance with a preferred embodiment of the present invention.

FIG. 10 shows a tree structure for describing reassembling of a highest parent PDU from retransmitted PDUs having SSNs in a receiving buffer in accordance with a preferred embodiment of the present invention. This tree is a full binary tree. If a PDU that is allowed to have sub PDUs is defined as a node and a PDU that is not allowed to have sub PDUs is defined a leaf, PDUs having SSNs of 2 and 3 become the nodes and PDUs having SSNs of 4, 5 and 7 become the leafs, as shown in FIG. 10.

In order to reassemble the re-segmented PDUs to a highest PDU, it must inspect whether all of the re-segmented PDUs are received sequentially. A method of inspection may differ according to a location of the node or the leaf.

It assumes that P is a SSN of a predetermined PDU, L is a length of bits representing the SSN identification and D is a depth. If the predetermined PDU, i.e., a third node, is a first node or a leaf in a view of a parent PDU, a SSN of a PDU followed by the predetermined PDU is one of a set S calculated by following Eq. 3. Herein, X denotes an integer.

$$S = SSN_{\neq XtPDU} | P + 2^{L-D} - 1 + X \; 0 \leq X \leq D \qquad \text{Eq. 3}$$

For example, if the SSN of the predetermined PDU is 3, SSNs of following PDU may be 6 or 7. However, if the predetermined PDU, i.e., an eighth node, is a second node or a leaf, the set S is not calculated for the predetermined PDU P. That is, a set S' of a P' is calculated using a following Eq. 4. Herein, P' denotes a parent PDU located at a first node among parent nodes of the predetermined node, and D' is a depth of P'.

$$S' = SSN_{\neq XtPDU} | P' + 2^{L-D'} - 1 + X \; 0 \leq X \leq D \qquad \text{Eq. 4}$$

For example, if the SSN of the predetermined PDU is 15, there are parent PDUs having the SSNs of 1, 9 and 13. Among the parent PDUs, the parent PDU located at the first node has the SSN of 1. That is, P'=1. Accordingly, the set S' of P' is consisted of {16, 17, 18 and 19} and PDUs having those SSNs are child-PDUs sequentially followed by the predetermined P.

If such child-PDUs are orderly received, the receiving side determines that the highest parent PDU is normally received. The receiving side assembles a SDU with other retransmitted or not retransmitted PDUs using a SDU assembling method used for the wired channel and the assembled SDU is transferred to the higher layer.

While the present invention has been described with respect to certain preferred embodiments, it will be apparent to those skilled in the art that various changes and modifications may be made without departing from the scope of the invention as defined in the following claims.

What is claimed is:

1. A method of segmenting a packet into a plurality of processing data units (PDUs) at a transmitting side of a wireless communication system and transmitting the PDUs to a receiving side of the wireless communication system, while an environment of a channel of the transmission varies from time to time, the method comprising:
    selecting each of the plurality of PDUs and performing steps (a)-(e):
    (a) determining whether the selected PDU is a retransmitted PDU;
    (b) if the selected PDU is not a retransmitted PDU, transmitting the selected PDU from the transmitting side using the channel of the wireless communication system;
    (c) if the selected PDU is a retransmitted PDU, determining whether the selected PDU has a transmittable size allowed by a corresponding adaptive modulation and coding (AMC) option of the wireless communication system, representing the retransmitted PDU as a root node of a tree;
    (d) if the selected PDU has a transmittable size, transmitting the selected PDU from the transmitting side using the channel of the wireless communication system; and
    (e) if the selected PDU does not have a transmittable size, segmenting the selected PDU into segmented PDUs, representing the selected PDU as a parent node of the tree, and each of the segmented PDUs as a child node of the tree,
    inserting a header and a sub header with identification information for reassembling into each of the segmented PDUs, the identification information corresponding to a depth of the child node, and,
    selecting each of the segmented PDUs and treating the selected segmented PDU as a selected PDU to repeat steps (c) to (e)
    wherein
    the segmenting in step (e) includes partitioning the selected PDU into a first segmented PDU and a second segmented PDU,
    first identification information of the first segmented PDU is a first sub sequence number (SSN) defined by: $SSN_{1stPDU}=P+1$,
    second identification information of the second segmented PDU is a second SSN defined by: $SSN_{2ndPDU}=P+2^{(L-D-1)}$,
    P denotes a sub sequence number before the partitioning,
    L is a bit length of the identification information, and
    D is a depth of a node corresponding to a respective one of the first and second segmented PDUs.

2. The method as recited in claim 1, wherein the header includes information denoting whether the sub header is inserted or not.

3. The method of claim 1, further comprising the step of inserting parameters related to retransmission in the sub header for a retransmission of the selected PDU.

4. A method of reassembling a packet in a wireless communication system, the packet being segmented at a transmitting side of the wireless communication system into a plurality of processing data units (PDUs), which are transmitted to and received at a receiving side of the wireless communication system through a transmission channel having an environment varied from time to time, each PDU having a same sequence number (SN) and a sub sequence number (SSN), the receiving side having a receiving buffer, the method comprising the steps of:
    determining at the receiving side of the wireless communication system whether one of the received PDUs is a retransmitted PDU; and
    if the one PDU is a retransmitted PDU,
        finding, from the receiving buffer, PDUs having the same SN as the one PDU;
        representing the found PDUs using a tree, each found PDU being a node of the tree, the SSN of each found PDU corresponding to a depth of the node;
        choosing one of the found PDUs that has a specific SSN that is smaller than and closest to the SSN of the one PDU; and
        inserting the one PDU after the chosen PDU to reassemble the one PDU and the chosen PDU, wherein
    the tree is a full binary tree;
    the found PDUs including a first PDU having a first SSN and a second PDU having a second SSN, the second SSN being larger than and closest to the first SSN in the tree, the first PDU having a parent PDU with a parent SSN;
    if the first PDU is a first child of the parent PDU, the second SSN is defined by: $P+2^{L-D}-1+X(0 \leq X \leq D)$, wherein P denotes the first SSN, L denotes a length of bits for representing a SSN identification, D is a depth of a node representing the first PDU, and X is an integer, and
    if the first PDU is a second child of the parent PDU, the second SSN is defined by: $P'+2^{L-D'}-1+X(0 \leq X \leq D)$, wherein P' denotes the parent SSN, D denotes a depth of a node representing the parent PDU, and X is an integer.

* * * * *